US012330929B2

(12) United States Patent
Wahlsten

(10) Patent No.: US 12,330,929 B2
(45) Date of Patent: Jun. 17, 2025

(54) HARNESS SADDLE FOR HORSES

(71) Applicant: Tomi Wahlsten, Lahti (FI)

(72) Inventor: Tomi Wahlsten, Lahti (FI)

( * ) Notice: Subject to any disclaimer, the term of this patent is extended or adjusted under 35 U.S.C. 154(b) by 0 days.

(21) Appl. No.: 18/591,256

(22) Filed: Feb. 29, 2024

(65) Prior Publication Data

US 2024/0208796 A1 Jun. 27, 2024

Related U.S. Application Data

(63) Continuation-in-part of application No. 17/049,424, filed as application No. PCT/FI2019/050337 on Apr. 26, 2019, now abandoned.

(30) Foreign Application Priority Data

Apr. 30, 2018 (FI) ..................................... 20187061

(51) Int. Cl.
*B68B 3/00* (2006.01)

(52) U.S. Cl.
CPC ..................................... *B68B 3/00* (2013.01)

(58) Field of Classification Search
CPC ....................................................... B68B 3/00
See application file for complete search history.

(56) References Cited

U.S. PATENT DOCUMENTS 58,884 A 10/1866 Rains et al.
112,073 A * 2/1871 Pond ......................... B68B 3/00 54/41.1
130,906 A 8/1872 Dutton
153,445 A * 7/1874 McCraken ................ B68B 3/00 54/41.1
199,225 A * 1/1878 Ridgley .................... B68B 3/00 54/41.1
220,273 A 10/1879 Cahoone
220,846 A 10/1879 Johnson
245,219 A 8/1881 Rittenhouse
274,078 A * 3/1883 Zeller ....................... B68B 3/00 54/41.1
277,291 A * 5/1883 Kettering .................. B68B 3/00 54/41.1

(Continued)

FOREIGN PATENT DOCUMENTS

DE 102012106008 A1 5/2014
FI 4101 U1 8/1999
FR 354004 A 9/1905

OTHER PUBLICATIONS

International Search Report for PCT/FI2019/050337, mailed Aug. 16, 2019, 3 pages.

(Continued)

*Primary Examiner* — Jessica B Wong
(74) *Attorney, Agent, or Firm* — NIXON & VANDERHYE

(57) ABSTRACT

Disclosed is a horse harness saddle for pulling a cart. The harness saddle included portion which arches towards both sides of the horse and towards horse's tail so that the harness saddle bypasses the horse's withers, at the back thereof when the harness saddle is worn by the horse. Also disclosed is a method for releasing pressure of pressure towards horse's withers, wherein the horse is harnesses to the cart by the disclosed harness.

14 Claims, 5 Drawing Sheets

(56) References Cited

U.S. PATENT DOCUMENTS

| | | | | | |
|---|---|---|---|---|---|
| 279,123 | A * | 6/1883 | Bickle et al. | B68B 3/00 | 54/41.1 |
| 316,801 | A * | 4/1885 | McFadden | B68B 3/00 | 54/38.1 |
| 369,058 | A * | 8/1887 | Jacobs | B68B 3/00 | 54/2 |
| 484,801 | A * | 10/1892 | Kurtz | B68B 3/00 | 54/41.1 |
| 532,534 | A * | 1/1895 | Clark | B68B 3/00 | 54/2 |
| 537,247 | A | 4/1895 | Teas | | |
| 567,203 | A | 9/1896 | Stephens | | |
| 736,760 | A * | 8/1903 | Miller | B68B 3/00 | 54/41.1 |
| 897,629 | A * | 9/1908 | Koch | B68B 3/00 | 54/41.1 |
| 915,076 | A * | 3/1909 | Cummings et al. | B68B 3/00 | 54/55 |
| 916,311 | A * | 3/1909 | Hendricks | B68B 3/00 | 54/64 |
| 985,293 | A | 2/1911 | Scruby | | |
| 1,001,840 | A | 8/1911 | Goetz | | |
| 1,097,992 | A | 5/1914 | Seyb | | |
| 1,099,148 | A * | 6/1914 | Krug | B68B 3/00 | 54/41.1 |
| 1,164,173 | A * | 12/1915 | Tour | B68B 3/00 | 54/64 |
| 1,182,021 | A * | 5/1916 | Langiell | B68B 3/00 | 54/41.1 |
| 1,328,922 | A * | 1/1920 | Jardine | B68B 3/00 | 54/39.1 |
| 1,357,823 | A * | 11/1920 | Read | B68B 3/00 | 54/66 |
| 1,459,214 | A * | 6/1923 | Keller | B68B 3/00 | 54/41.1 |
| 1,575,515 | A * | 3/1926 | Adams | B68B 3/00 | 54/1 |
| 4,414,790 | A | 11/1983 | Mitchell | | |
| 2004/0231303 | A1* | 11/2004 | Girault | B68B 3/00 | 54/44.7 |
| 2005/0223684 | A1* | 10/2005 | Gronberg | B68B 3/00 | 54/39.1 |
| 2012/0180440 | A1* | 7/2012 | Rynningen | B68B 5/02 | 54/71 |

OTHER PUBLICATIONS

Search Report for FI20187061, dated Aug. 16, 2018, 2 pages.
U.S. Appl. No. 17/049,424, filed Oct. 21, 2020, Jessica B Wong, Apr. 3, 2025.

* cited by examiner

HARNESS SADDLE FOR HORSES

CROSS REFERENCE TO RELATED APPLICATIONS

This application is a Continuation-in-Part of application Ser. No. 17/049,424, filed on Oct. 21, 2020, which is the National Phase under 35 U.S.C. § 371 of International Application No. PCT/FI2019/050337, filed on Apr. 26, 2019, which claims the benefit under 35 U.S.C. § 119(a) to Patent Application No. 20187061, filed in Finland on Apr. 30, 2018, all of which are hereby expressly incorporated by reference into the present application.

FIELD OF THE INVENTION

This invention relates to a novel harness saddle for reducing the discomfort or pain experienced by the horse at the withers when pulling various carts.

PRIOR ART

The withers of a horse are an area which easily develops sores and muscle tension due to pressure from the harness. Besides, the harness saddle transmits the forces originating from the carriage, via the shafts, to the horse, causing soreness of the horse's back.

A harness saddle is a part of a horse harness. Its shape is closest to a broad band passing over the horse's back. If often comprises pads and two rein terrets through which the reins run. Under the chest, the harness saddle is fastened by a so-called tight belly girth. The harness saddle serves for two purposes: in very light driving (such as racing), the shafts can be directly fastened to the harness saddle, the pulling by the horse thus being transmitted through the harness saddle; in heavier driving, the shafts are fastened to collar hames but run through the harness saddle, the harness saddle thus preventing the shafts from moving in a disturbing manner.

The various equipment worn by horses, such as the harness saddle, often causes discomfort and even pain to the horse if it is not properly fitted to the horse. Because each horse is an individual, industrially manufactured harness saddles rarely are a perfect fit for the horse. This causes discomfort and pain to the horse, making the horse sore or incapable of optimum performance in harness racing, for example. If the horse's withers become sore, an equine massage therapist is often called for help, for example. Since this kind of therapy is expensive, a badly fitted harness saddle not only causes pain to the horse but also expenses to the owner.

FIG. 1 is a top view a prior-art harness saddle 100, seen in the (–) y-direction of a coordinate system 199. The harness saddle has a first side 101*a* and a second side 101*b*. When this harness saddle is worn by a horse, the first side and the second side face the horse's head and the horse's tail, respectively. Both the first side and the second side are substantially parallel, and when the harness saddle is worn by a horse, these sides are perpendicular to the sides 102*a*, 102*b* as well as the spine of the horse. The harness saddle 100 is symmetrical with respect to section lines A-A and B-B.

When the harness saddle shown in FIG. 1 is worn by a horse, the first side of the harness saddle may exert pressure on the horse's withers. This often causes soreness of the withers. The best solution to this problem is to make a harness saddle that is good fit for the horse and does not cause pain at its withers but, nevertheless, transmits, via the harness, all of the horse's pulling force to the carriage or cart.

A number of attempts have been made to solve this problem, such as by manufacturing harness saddles designed to leave air space between the horse's spine and the harness saddle. Another way of solving this problem is to attach, on both sides of the horse's withers, parts made of leather or wood, and to support the harness saddle against these parts.

The above-mentioned solutions may have partly solved the problem of sore horse withers. However, these solutions have not fully overcome the problem, i.e. how not to cause pain or discomfort to a horse's withers and to, at the same time, maximally transmit the horse's pulling force, by means of the shafts and straps, to the cart pulled by the horse.

Therefore, there still exists a need to design improved harness saddles fitted for horses.

SUMMARY

To solve the above-mentioned problems, a novel harness saddle for horses has been developed for more effective pulling of carts and carriages as well as for preventing the horse's withers from becoming sore or for not causing unnecessary muscle tension in the horse.

Thus, the invention relates to a horse harness saddle for pulling carts, comprising a first side and a second side wherein both the first side and the second side are outer sides of the harness saddle wherein the harness saddle comprising a portion adapted to arch from center part of the of the harness saddle towards both sides of the horse and towards the horse's tail, so that the harness saddle bypasses the horse's withers, at the back thereof, when the harness saddle is worn by the horse.

The invention also relates to a method of reducing the pressure on a horse's withers in harness racing, the method comprising harnessing the horse to a cart by means of a harness saddle according to the invention.

DESCRIPTION OF THE INVENTION

Figure 1:
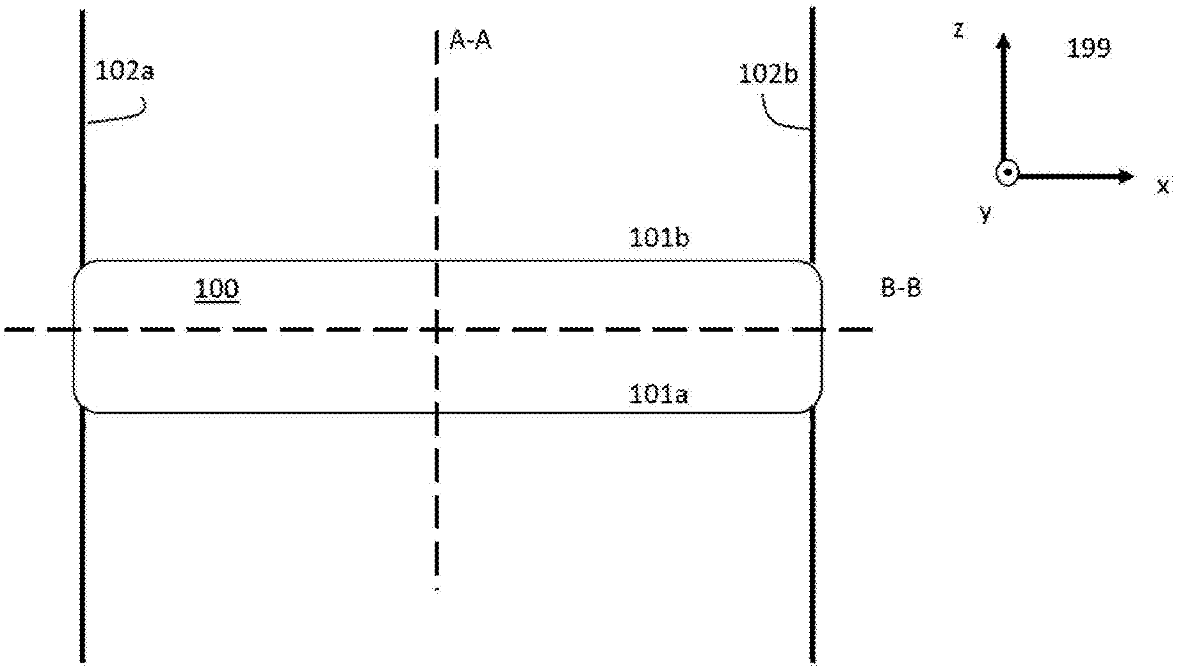
Figure 1 (prior art)
FIG. 1 shows a prior-art harness saddle worn by a horse.

FIG. 1 has been explained in the prior-art chapter of this document.

Figure 2A:
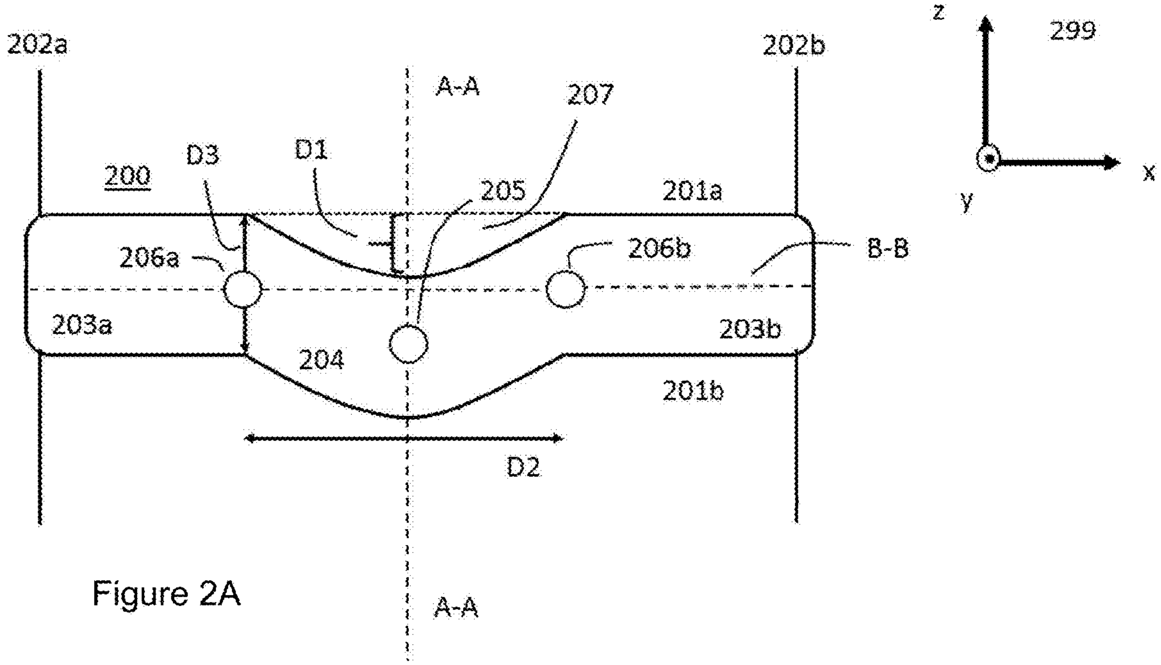
FIG. 2A is a top view of a harness saddle according to a non-limiting example of the invention, worn by a horse.
Figure 2B:
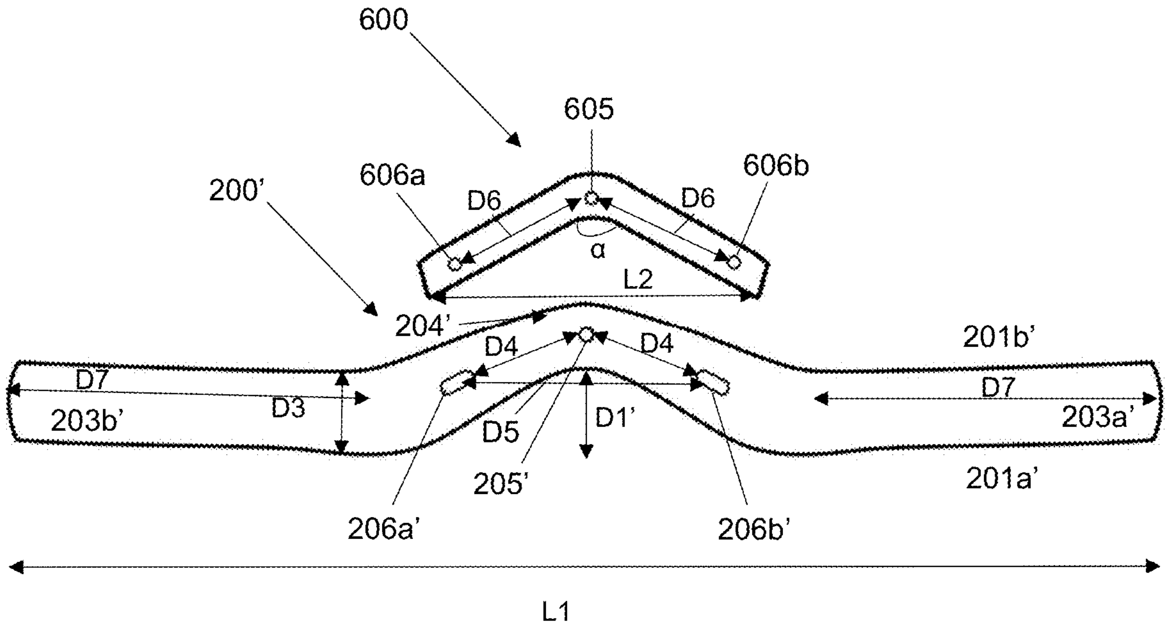
FIG. 2B shows a harness saddle according to a non-limiting exemplary embodiment of the invention and a saddle tree.

FIG. 2A shows a harness saddle according to a non-limiting exemplary embodiment of the invention. The figure shows a situation where the harness saddle according to the invention is worn by a horse. In the figure, the harness saddle 200 is seen from above, i.e., in the (–) y-direction of a coordinate system 299. The horse's sides (flanks) are referred to by 202*a* and 202*b*. FIG. 2B shows a harness saddle 200' according to a non-limiting exemplary embodiment of the invention and a saddle tree 600. The saddle tree 600 fits into the harness saddle 200'.

The harness saddle 200 according to FIG. 2A includes a first side 201*a*, a second side 201*b*, a first portion 203*a*, a second portion 203*b*, and a portion 204 therebetween, i.e. a rear bypass area. The first side and the second side face the horse's head and the horse's tail, respectively and the portion 204 arches from the center part of the harness saddle towards both sides of the horse and towards horse's tail, i.e. in (−) z-direction of the coordinate system 299 so that the harness saddle bypasses the horse's withers 207 from back thereof. Correspondingly, the first portion 203*a* and the second portion 203*b* arch along the horse's sides downwards i.e. in (−) y-direction of the coordinate system 299.

Typically, a center hole 205 is provided in the center of the harness saddle, and preferably, holes 206*a* and 206*b* are also provided for fastening means, such as screws. The harness saddle is typically symmetric with respect to section line A-A crossing the center hole and asymmetric in respect to section line B-B crossing the holes 206*a* and 206*b*.

The portion 204, i.e. the rear bypass area arches towards horse's tail. The arch D1 in the (−)-z direction of the coordinate system 299 is preferably 20-60 mm when measured at the center line of the harness saddle, i.e. at the position where the section line A-A-crosses the center hole. The length D2 of the rear bypass area is for example the same as the distance between the holes 206*a* and 206*b*. The width D3 of the harness saddle is typically 5-15 cm. The width of the harness saddle at the position of the center hole is typically 55 mm.

Thus, the harness saddle according to the invention is asymmetrical in respect to the section line B-B so as to conform to the natural shape of the withers of a horse. The harness saddle is designed to be curved, in an arched manner, backwards from the center portion of the harness saddle, towards the horse's tail, thus bypassing the wither area 207 extending upwards from the horse's back, towards the neck and up to the mane, in the front portion of the spine. This leaves more space for the horse's withers and prevents the horse's withers from becoming sore, while providing, at the same time, optimum support for fastening the harness to the harness saddle and for transmitting the pulling force of the horse to the cart or carriage.

According to an embodiment the rear bypass area, seen from above and compared to the prior art, is in the range of 30 to 40 mm, from the center line of the harness saddle. The rear bypass area extends 30 in both directions, from the center of the harness saddle to the screw holes positioned at an identical distance, which is 12 cm, for example, from the center hole. Therefore, in this example, the total length of the bypass area, which is arched backwards, is approximately 24 cm.

Now that this area of a horse's withers which develops sores can be bypassed further back, there is practically no pressure on the withers. All of the previously known products have directly passed over the withers, causing back problems. The difference from the past is most visible in a top view of the harness saddle because the previously known designs have always been straight and symmetrical when seen from above, but the harness saddle according to the invention is asymmetrical, being curved backwards from the center thereof. An offset of just a few centimeters backwards may contribute to relieving the pressure on the spine because, on the back of a horse, the ridged mane of the withers is followed, right behind the withers, by an evenly round shape. Therefore, this novel harness saddle reduces the pain or discomfort experienced by the horse but still provides maximum pulling of the cart.

The harness saddle 200' according to FIG. 2B includes a first side 201*a*', a second side 201*b*', a first portion 203*a*', a second portion 203*b*', and an arched portion 204' therebetween, i.e. a rear bypass area. The first side 201*a*' and the second side 201*b*' face the horse's head and the horse's tail, respectively, and the portion 204' arches from the center part of the harness saddle towards both sides of the horse and towards horse's tail so that the harness saddle bypasses the horse's withers from back thereof. Correspondingly, the first portion 203*a*' and the second portion 203*b*' arch along the horse's sides and the horse's flanks downwards. Both the first side 201*a*' and the second side 201*b*' arch toward the tail of the horse.

FIG. 2B illustrates the length L1 of the harness saddle 200' as being 85-125 cm (approximately 100 cm) for use with horses and 65-85 cm for use with ponies. The length L1 of the harness saddle 200' permits the harness saddle 200' to extend from the back of the horse (at the arched portion 204') along the flanks of the horse (see FIG. 2C) such that the first portion 203*a*' and the second portions 203*b*' extend along and against the flanks of the horse. The distance D7 of the first portion 203*a*' from where the arched portion 204' starts to arch toward the center to a distal end of the first portion 203*a*' and the distance D7 of the second portion 203*b*' from where the arched portion 204' starts to arch toward the center to a distal end of the second portion 203*a*' is 30-50 cm, e.g., 35 cm.

The distance at line D1' from the bottom of the arched portion 204' to a line perpendicular to the line D1' is preferably 20-130 mm, e.g., 73 mm, when measured at the center line of the harness saddle 200'. The width of the harness saddle is 5-15 cm.

A center hole 205' is provided in the center of the harness saddle 200' with holes 206*a*' and 206*b*' configured to receive a fastener, such as a screw. The distance D4 between the holes 206*a*', 206*b*' and the center hole 205' is 60-180 mm and preferably 120 mm. An exemplary distance D5 between screw holes is 220 mm.

The harness saddle 200' is configured to receive a saddle tree 600 attached thereto through center hole 605 and side holes 606*a* and 606*b*. The saddle tree may also be referred to as a skeleton. The saddle tree/skeleton is configured to attach to and fit to the harness saddle 200'. The center hole 605 aligns with the center hole 205' of the harness saddle 200'. The side holes 606*a*, 606*b* align with the holes 206*a*', 206*b*' of the harness saddle 200'. The saddle tree 600 may have a length L2 of 270 mm and a overall length of 300 mm. The distance D6 between the holes 606*a*, 606*b* and the center hole 605 is 120 mm. An exemplary distance D5 between screw holes is 220 mm. The width of the saddle tree 600 is 30 mm. The angle α at the arch of the saddle tree 600 is typically 140° (e.g., 120-160°).

The saddle tree 600 fits onto the harness saddle 200' by the use of fasteners, such as screws, through the holes 206*a*', 206*b*', 205' in the harness saddle 200' and corresponding holes 606*qa*, 606*b*, 605 in the saddle tree 600.

Figure 2C:
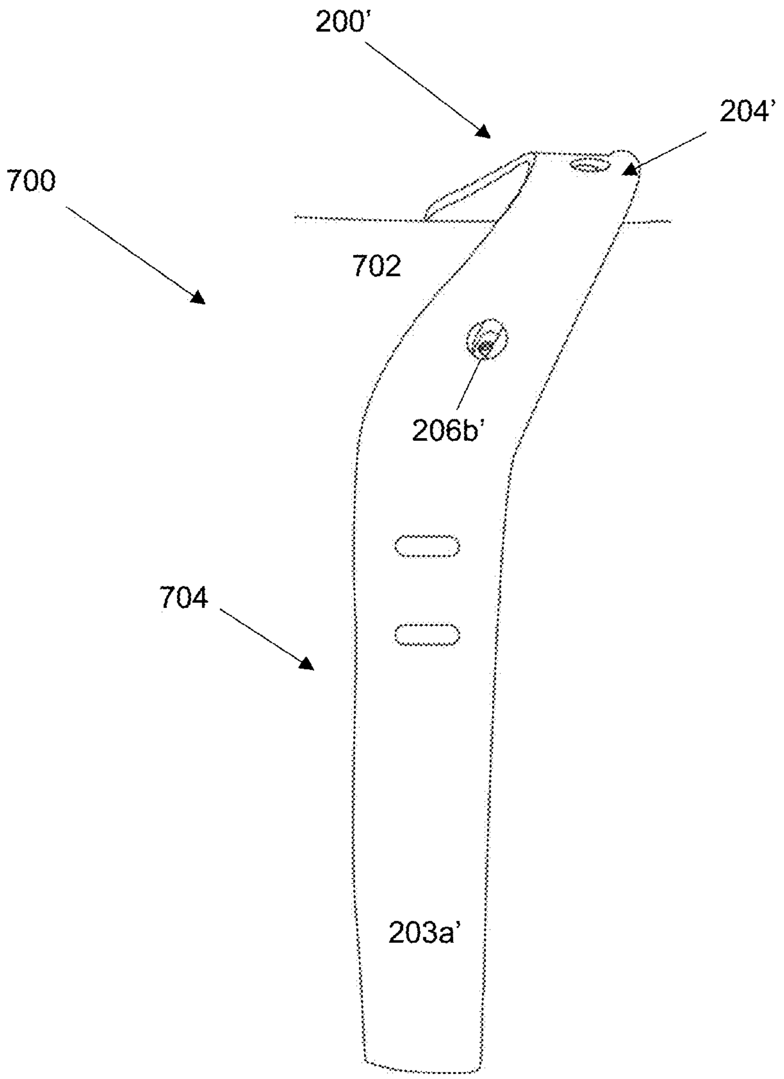
FIG. 2C shows the harness saddle of FIG. 2B positioned on a horse.

FIG. 2C illustrates the harness saddle 200' of FIG. 2B positioned on a horse 700. The arched portion is positioned along the back 702 of the horse 700 to bypass the withers. The first portion 203*a*' and the second portion 203*b*' of the harness saddle 200' each extend on a side of the horse 700 from the back 702 of the horse 700 and along the flanks 704 of the horse 700.

Figure 3:
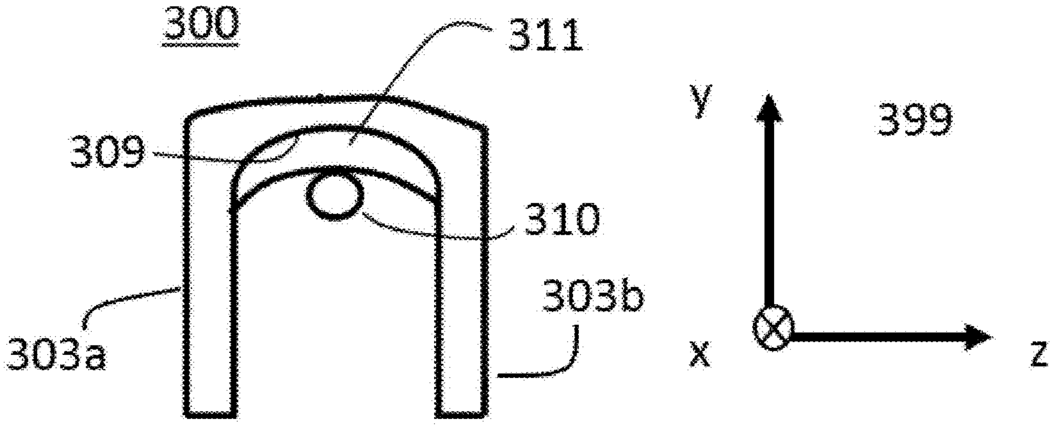
FIG. 3 is a front view of a harness saddle according to a non-limiting example of the invention, worn by a horse.

FIG. 3 shows a front view, i.e. as seen in the x-direction of a coordinate system 399 a harness saddle according to an exemplary embodiment of the invention. The figure shows the portions 303*a* and 303*b* descending downwards along horse's sides. The harness saddle shown in this figure is designed to leave air space between the portion 309, i.e. the portion of the harness saddle which is towards horse's back, and the horse's spine 310. The portion of the lower face of the harness saddle which enables this is a lower bypass area 311. The lower bypass area of the harness saddle according to the invention can best be seen in FIGS. 4B and 5B.

The material of the harness saddle which comes into contact with the horse may consist of a synthetic material, such as nylon, or a non-synthetic material, such as leather, providing a soft contact against the horse's skin. Typically, a skeleton is provided inside the harness saddle, to provide shape and necessary rigidity to the harness saddle. Typically, the skeleton is made of steel but, instead of steel, it can be made of some other material, such as carbon fibers.

The harness saddle may vary in size, depending on the body structure of the horse. Typically, the width of the harness saddle is 5 cm to 15 cm. The width of the harness saddles at the center hole are typically 55 mm. The length of the harness saddle is approximately 100 cm, bending over the horse's back, along both two sides of the horse. Further, shorter harness saddles with the same proportions are manufactured for smaller horse breeds and ponies.

On the back of a horse, the harness saddle serves to attach a cart pulled by the horse, at cart shafts, to the horse, when driving the horse. The harness saddle sits on the back of the horse by means of specific fastening straps. There are two principal ways of attaching the cart to the harness saddle. One of them is the shaft loop harness, having two subdivisions—a so-called standard shaft loop harness/conventional model and loop thru model with a binding strap, instead of a loop, tied around the shaft.

The other way of attaching the cart to the harness saddle is the Quick Hitch harness, with integrated shaft fittings fastened to the harness or the harness saddle, or to harness saddle locking devices, in a spring-loaded manner.

All of the above-described methods of attachment represent internationally known standards, and the novel harness saddle presented herein can be fastened to a carriage pulled by a horse by employing any of the above-described methods of attachment.

FIGS. 4 and 5 are a front, lateral and top view of the harness saddles according to the invention.

Figure 4A:
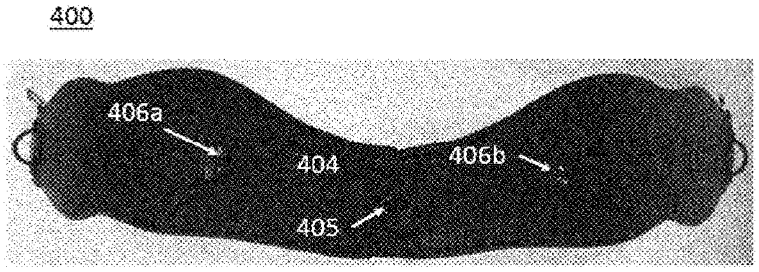
FIGS. 4A to 4C are a top, lateral and front view of a harness saddle according to a non-limiting example of the invention, respectively.

FIG. 4A is a top view of the harness saddle 400 according to invention. The rear bypass area 404 of the harness saddle, seen from above and compared to the prior art, is approximately 20 to 60 mm from the center line of the harness saddle. The rear bypass area extends, on both sides, from the center of the harness saddle, in both directions, to the screw holes 406*a*, 406*b*, positioned at an identical distance, which is 12 cm, for example, from the center hole 405. Therefore, the total length of the bypass area, which is arched backwards, is approximately 24 cm, thus leaving the horse's withers practically pressure-free.

Figure 4B:
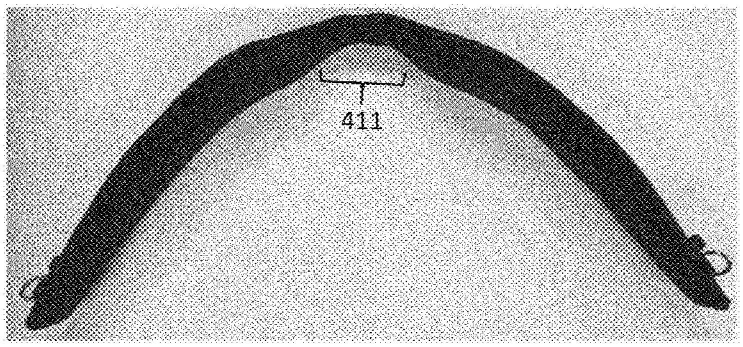

FIG. 4B is a front view of the harness saddle 400. The figure shows the lower bypass area 411 of the harness saddle where the harness saddle is designed to leave air space between the horse's spine and the harness saddle. The lower bypass area is located at the center hole 405 of the harness saddle.

Figure 4C:
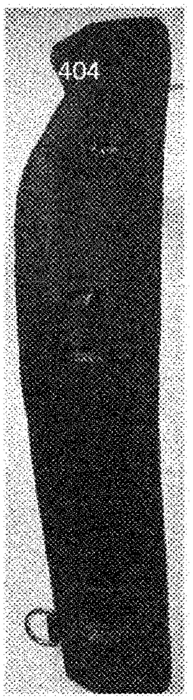

FIG. 4C is a lateral view of the harness saddle 400. The figure shows the rear bypass area 404.

Figure 5A:
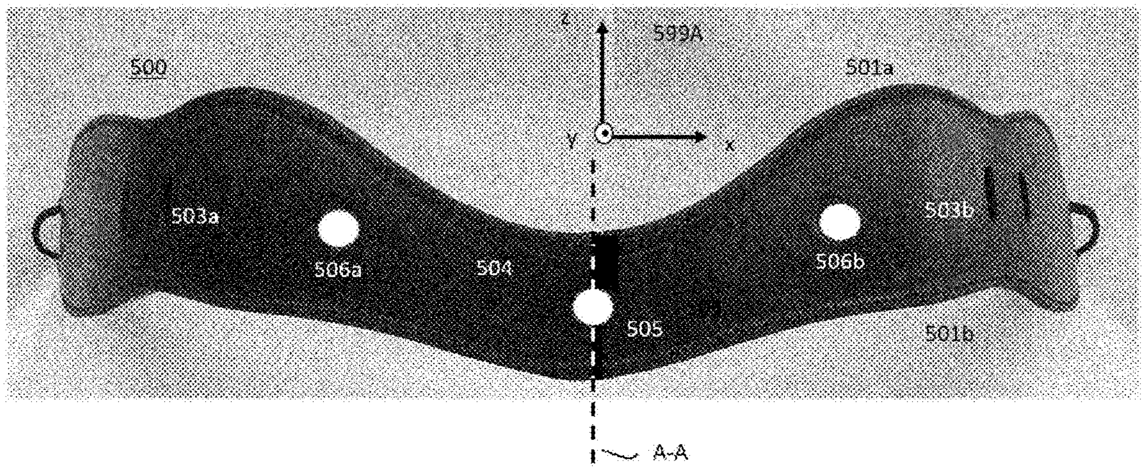
FIGS. 5A to 5C are a top, lateral and front view of a harness saddle according to a non-limiting example of the invention, respectively.
Figure 5B:
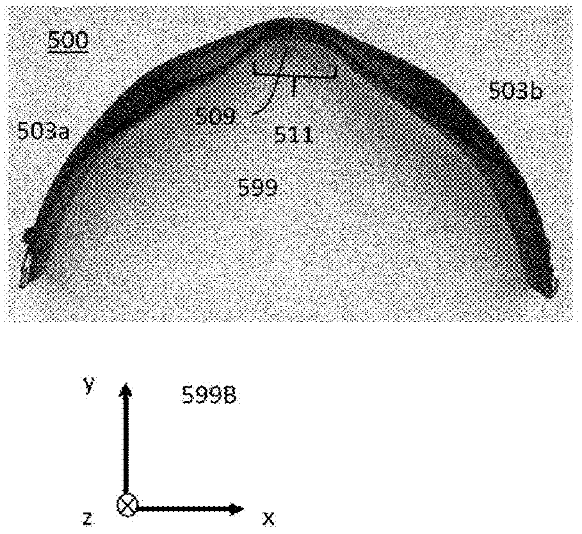
Figure 5C:
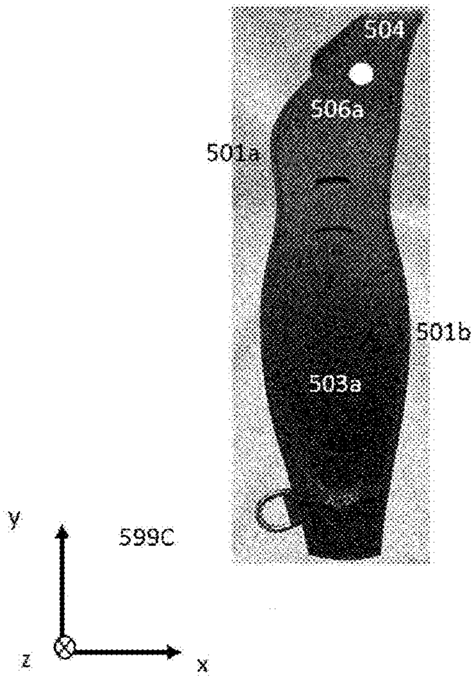

FIGS. 5A to 5C show a harness saddle according to another embodiment. In FIG. 5A the harness saddle is shown from above, i.e. in (−) y-direction of the coordinate system 599A. The harness saddle comprises a first side 501*a*, a second side 501*b*, portions 503*a* and 503*b* descending along sides of the horse, and a portion 504 therebetween, i.e. the rear bypass area. The first side of the harness saddle and the second side of the harness saddle is towards horse's head and the second side is towards horse's tail, respectively, when the harness saddle is worn by the horse. There is a hole 505 in the center part of the harness saddle and in the same distance from the hole 505 there are holes 506*a* and 506*b* for fastening means such as screws. The harness saddle 500 is symmetrical in respect to the section line A-A in z-direction of the coordinate system 599 crossing the central hole.

FIG. 5B is the front view of the harness saddle 500, i.e. seen in z-direction of the coordinate system 599B. The figure shows the portions 503*a* and 503*b* descending downwards the sides of the horse. The harness saddle has been designed so that there is airspace between the portion 509 i.e. the portion facing horse's back and the horse's spine. The lower surface of the harness saddle which enables this is a lower bypass area 511.

FIG. 5C is the lateral view of the harness saddle 500, i.e. seen in z-direction of the coordinate system 599C. The figure shows the first portion 503*a* descending downwards the horse's side, the sides of the harness saddle 501*a* and 501*b*, the portion 504, i.e. the rear bypass area and the first hole 506*a* for the fastening means.

The invention also relates to a method of reducing the pressure on the withers of a horse in harness racing. In this method, the horse is harnessed to a cart by means of a harness saddle according to the invention.

In the following embodiments of the invention will be set forth in numbered clauses.

1. A Harness saddle (400) for a horse, characterized in that the harness saddle (400) comprises a rear bypass area (404) extending, in an arched manner, towards both sides of the horse and bypassing an area of the horse's withers, prone to becoming sore, at the back thereof, thus reducing the pressure on the horse's withers.
2. The harness saddle as defined in clause 1, characterized in that it also comprises a lower bypass area (411) leaving air space between the horse's spine and the harness saddle.
3. The harness saddle as defined in clause 1, characterized in that the rear bypass area of the harness saddle, seen from above, is 30 to 40 mm from the center line of the harness saddle, and extends from the center of the harness saddle, in both directions, around the horse, over a distance of approximately 12 cm.
4. A method of reducing pressure on the back of a horse, at its withers, in harness racing, characterized in that a harness saddle (400) comprising a rear bypass area (404), extending, with an identical arch on both sides of the horse, and bypassing an area of the horse's withers, prone to becoming sore, at the back thereof, thus reducing the pressure on the horse's withers.
5. The method as defined in clause 4, characterized in that the harness saddle (400) used for attaching the horse to the cart also comprises a lower bypass area (411) leaving air space between the horse's spine and the harness saddle.
6. The method as defined in clause 4, characterized in that, in a top view, the rear bypass area of the harness saddle used for attaching the horse to the cart is approximately 30 to 40 mm from the center line of the harness saddle and extends from the center of the harness saddle, in both directions, around the horse, over a distance of approximately 12 cm.

It will be appreciated by a person skilled in the art that the invention is not limited to the above-described exemplary embodiments but may vary within the scope of the accompanying claims. It will also be obvious to the person skilled in the art that the harness saddle can be made of other materials than those mentioned in this application. It will also be obvious to the person skilled in the art that, by changing the dimensions, an equivalent invention can be developed for a horse with an unusual anatomy, for example.

The invention claimed is:

1. A harness saddle for a harness of a horse for pulling a cart, the horse having a head, a tail, a back, and flanks, the harness saddle comprising:

a first portion configured to extend to a first flank of the horse between the head and the tail, the first portion having a first edge, a second edge opposite the first edge, a central longitudinal axis extending longitudinally through the first portion and spaced from the first and second edges of the first portion, and a distal end portion distal with respect to a center part of the harness saddle, the first edge of the first portion configured to be disposed proximal to the head of the horse and distal to the tail of the horse when the harness saddle is positioned on the horse, the second edge of the first portion configured to be disposed distal to the head of the horse and proximal to the tail of the horse when the harness saddle is positioned on the horse;

a second portion configured to extend to a second flank of the horse between the head and the tail and opposite the first side of the horse, the second portion having a first edge, a second edge opposite the first edge, a central longitudinal axis extending longitudinally through the second portion and spaced from the first and second edges of the second portion, and a distal end portion distal with respect to the center part of the harness saddle, the first edge of the second portion configured to be disposed proximal to the head of the horse and distal to the tail of the horse when the harness saddle is positioned on the horse, the second edge of the second portion configured to be disposed distal to the head of the horse and proximal to the tail of the horse when the harness saddle is positioned on the horse; and an area arching from the center part of the harness saddle at the back of the horse towards the first and second flanks of the horse when the harness saddle is positioned on the horse, the area arching in the direction of the tail of the horse when the harness saddle is positioned on the horse, so that the harness saddle bypasses the withers of the horse at a back of the horse, when the harness saddle is worn by the horse, the area arching from the first edges of the first and second portions towards the center part and the tail of the horse when the harness saddle is positioned on the horse at a first arched edge and also arching from the second edges of the first and second portions away from the center part towards the tail of the horse when the harness saddle is positioned on the horse at a second arched edge opposite the first arched edge, wherein the first and second portions are configured to respectively extend down along the flanks of the horse from the back of the horse such that the distal end portions of the first and second portions are at the first and second flanks of the horse when the harness saddle is positioned on the horse, a central axis of the harness saddle extending through the first arched edge and the second arched edge and being substantially perpendicular to the longitudinal axis of the first portion and the longitudinal axis of the second portion, and the harness saddle including the first portion, the second portion, and the area arching from the center part of the harness saddle are integrated together as a single piece.

2. The harness saddle according to claim 1, wherein the length of the harness saddle is 85-125 cm.

3. The harness saddle according to claim 1, wherein the length of the harness saddle is 65-85 cm.

4. The harness saddle according to claim 1, a distance from a peak of the arched portion to a bottom of the arched portion opposite the peak, along the central axis is 12-130 mm.

5. The harness saddle according to claim 1, wherein the width of the harness saddle is 5-15 cm.

6. The harness saddle according to claim 1, further comprising a center hole, a first hole for a first fastener, and a second hole for a second fastener.

7. The harness saddle according to claim 6, wherein the first and second holes of the harness saddle are configured to engage with fastening holes of a saddle tree.

8. The harness saddle according to claim 6, wherein the first and second holes are equidistant from the center hole.

9. The harness saddle according to claim 8, wherein the distance from the first and second holes to the center hole, respectively, is 60-180 mm.

10. The harness saddle according to claim 6, wherein a length of the area configured to arch from the center part of the harness saddle towards the first and second flanks of the horse and towards the tail of the horse is equal to the distance between the first hole and the second hole.

11. The harness saddle according to claim 6, wherein a peak of an arch of the area arching from the center part of the harness saddle towards the first and second flanks of the horse and towards the tail of the horse is 20-60 mm from a position aligned with the central hole and the first edges of the first and second portions of the harness saddle.

12. The harness saddle according to claim 1, wherein the harness saddle is configured to leave air space between a lower face of the harness saddle and a spine of the horse.

13. The harness saddle according to claim 1, further comprising at least one channel defined in the harness saddle, the at least one channel being configured to receive attachment devices to attach the harness saddle to the harness that is configured to attach to cart shafts of the cart.

14. The harness saddle according to claim 1, wherein a distance of the first portion from where the arched area begins to arch toward the center to the distal end of the first portion is 30-50 cm, and a distance of the second portion from where the arched area begins to arch toward the center to the distal end of the second portion is 30-50 cm.

* * * * *